United States Patent [19]

Jeffs et al.

[11] Patent Number: 5,032,343

[45] Date of Patent: Jul. 16, 1991

[54] METHOD FOR PRODUCING MEDICAL MICRO PIPETTE TIPS FOR DIFFICULT TO REACH PLACES

[75] Inventors: David H. Jeffs; Paul M. Jessop, both of Salt Lake City, Utah

[73] Assignee: Multi-Technology, Inc, Midvale, Utah

[21] Appl. No.: 48,347

[22] Filed: May 11, 1987

Related U.S. Application Data

[62] Division of Ser. No. 930,203, Nov. 13, 1986, Pat. No. 4,721,680, which is a division of Ser. No. 895,104, Aug. 11, 1986, Pat. No. 4,707,337.

[51] Int. Cl.[5] .......... B29C 57/00

[52] U.S. Cl. .......... 264/320; 264/328.1; 425/393; 425/577

[58] Field of Search .......... 264/328.1, 328.8, 294, 264/296, 319, 320; 249/122, 63, 144; 425/577, 468, 393

[56] References Cited

U.S. PATENT DOCUMENTS

| | | | |
|---|---|---|---|
| 2,269,823 | 1/1942 | Kreistelman | 128/207.15 |
| 3,141,336 | 7/1964 | Oates | 73/425.4 |
| 3,337,095 | 8/1967 | Marbach et al. | 222/309 |
| 3,367,926 | 2/1968 | Voeks | 264/211 |
| 3,385,553 | 5/1968 | Braun | 425/577 |
| 3,424,838 | 1/1969 | Buus | 425/393 |
| 4,005,166 | 1/1977 | Quick | 264/328.7 |
| 4,049,534 | 9/1977 | Posner | 204/299 |
| 4,083,903 | 4/1978 | Gilbert et al. | 264/328.8 |
| 4,161,508 | 7/1979 | Jänchen | 422/100 |
| 4,244,910 | 1/1981 | Yui et al. | 264/328.12 |
| 4,305,799 | 12/1981 | Schwartz et al. | 204/180 |
| 4,404,159 | 9/1983 | McFarlane | 425/393 |
| 4,422,995 | 12/1983 | Schad | 425/116 |
| 4,596,563 | 6/1986 | Pande | 604/280 |
| 4,596,780 | 6/1986 | Castaneda | 436/176 |
| 4,647,419 | 3/1987 | Helfer et al. | 425/577 |
| 4,750,877 | 6/1988 | McFarlane | 425/577 |

FOREIGN PATENT DOCUMENTS

| | | | |
|---|---|---|---|
| 207154 | 2/1984 | Denmark | 422/100 |
| 126390 | 5/1984 | European Pat. Off. . | |
| 182943 | 4/1986 | European Pat. Off. . | |
| 2315320 | 1/1977 | France . | |
| 1317708 | 5/1973 | United Kingdom . | |

OTHER PUBLICATIONS

Eppendorf Micro Pipette Advertisements.

Brink Micro Pipette Advertisement *Biomedical Products,* Mar. 1986, p. 46.

Drummond Sequencing Pipet.

Labindustries Positive Displacement Pipettor Advertisement *Biomedical Products,* May 1986, p. 12 and 42.

Costar Pipette tips Advertisement *Biomedical Products,* May 1986, p. 19.

Gibcoware Advertisements *Biomedical Products,* May, 1986, p. 17.

Labindustries Today—Liquid Handling Systems (Advertisement) Feb. 1983, Labindustries, all pages.

*Primary Examiner*—Jill L. Heitbrink

*Attorney, Agent, or Firm*—Lynn G. Foster

[57] ABSTRACT

Low cost medical micro pipette tips for difficult to reach places, and related methods. The leading or distal portion of the micro pipette tips are materially elongated and ultra thin. This accommodates placement of the distal influent port, for receiving expensive biological extracts, in hard to reach places.

1 Claim, 4 Drawing Sheets

Fig. 14
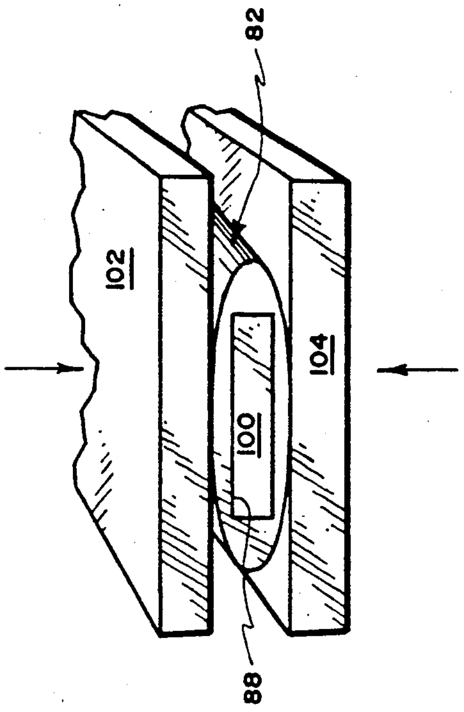
Fig. 13
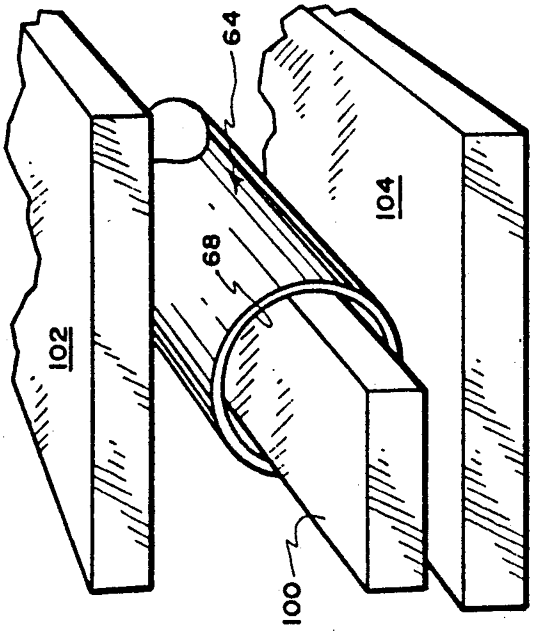
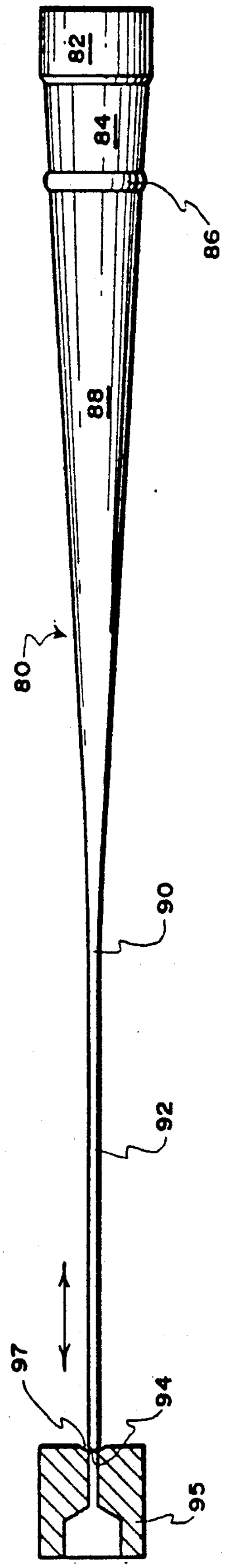
Fig. 15

METHOD FOR PRODUCING MEDICAL MICRO PIPETTE TIPS FOR DIFFICULT TO REACH PLACES

This application is a division of our co-pending U.S. Pat. application Ser. No. 930,203 filed Nov. 13, 1986, now U.S. Pat. No. 4,721,680, which is a division of our co-pending U.S. Pat. application Ser. No. 895,104, filed Aug. 11, 1986, now U.S. Pat. No. 4,707,337.

FIELD OF INVENTION

The present invention relates generally to pipette tips and more particularly to low cost medical micro pipette tips for difficult to reach places, and related methods.

PRIOR ART

The known prior art is illustrated in FIGS. 1 through 4, and comprises low cost essentially rigid pipette tips formed of synthetic resinous material, which are of relatively large transverse dimensions and limited length. It is impossible to fully evacuate expensive liquid extract from test tubes, vials and the like using prior art pipette tips of the type illustrated in FIGS. 1-4. Unsuccessful attempts have been made by others to extend and narrow the leading end of low cost medical micro pipette tips to provide flexibility and substantial reduced size, to enhance extract pick-up in difficult to reach places without destroying the operability of such during attempted use, i.e. by crimping, kinking or otherwise occluding the small interior passageway. For example, heat stretching of the leading end of a low cost prior art tip, of the type illustrated in FIG. 1, produced an inoperable and medically unacceptable elongated micro pipette tip. Complex and expensive apparatus has also been proposed, which is of general interest only.

BRIEF SUMMARY AND OBJECTS OF THE PRESENT INVENTION

In brief summary, the present invention comprises low cost medical micro pipette tips for difficult to reach places, and related methods. In the present preferred configurations of the present invention, the leading or distal portion of the micro pipette tips are materially elongated and ultra thin when compared with the prior art and are flexible, but non-occluding. This accommodates placement of the distal influent/effluent port, for receiving and discharging biological extracts, in hard to reach places, such as between closely placed testing plates used in biological electrophoresis, or directly or arcuately, without occlusion, into the lowest normally inaccessible regions of test tubes and vials, which hold residual amounts of very costly biological extracts.

Accordingly, it is a primary object of the present invention to provide novel pipette tips, and related methods.

A further significant object of this invention is the provision of novel low cost medical micro pipette tips for difficult to reach places, and related methods.

Another important object is the provision of unique medical micro pipette tips for difficult to reach places wherein the distal end portion thereof is flexible, elongated and ultra thin but non-occluding.

An additional object of the present invention is the provision of a novel medical micro pipette tip which accommodate placement of the distal end influent port, for receipt of biological extracts, in hard to reach normally inaccessible places, without occlusion of the internal flow path within the micro pipette tip.

These and other objects and features of the present invention will be apparent from the detailed description taken with reference to the accompanying drawings.

BRIEF DESCRIPTION OF THE DRAWINGS

FIGS. 13 and 14 illustrate diagramatically the manner in which the medical micro pipette top of FIG. 5 can be further fabricated to create the micro pipette tip of FIG. 9, and FIG. 15 is a preferred core used in fabricating the pipette tip of FIG. 5.

DETAILED DESCRIPTION OF THE ILLUSTRATED EMBODIMENTS

It is commonplace in the medical field to engage in various forms of testing of solutions wherein a known amount of solution is removed from a container or confinement site, using a pipette tip, and thereafter placed from the pipette tip in various types of testing equipment for medical processing. Such solutions or extracts are typically very expensive. It is, therefore, very important that such extracts not be wasted. By way of example, RNA extract and DNA extract, each of which contains genes, are obtained by withdrawing blood from a patient. These extracts are withdrawn from a container or confinement site, such as a beaker, vial or test tube, using a pipette tip and are processed as indicated. Sometimes but not always the extract testing process includes electrophoresis techniques.

In the past, it has been difficult, if not impossible to reach and remove all or substantially all of such extracts from their containers or confinement using state-of-the-art pipette tips. The rigidity and limited length of the conventional prior art pipette tips have made it impossible for such tips to fully evacuate such extracts from their containment or confinement. Accordingly, a substantial economic waste has occurred due to inefficiency.

Prior attempts to extend the length of the distal end portion of such prior art pipette tip to provide better access to difficult to reach places where, for example, residual extract exists have failed. For example, heat stretching of the conventional pipette tips resulted in occlusion of the interior pipette flow path during use. The basic problem resides in the inability of the prior art to mold or otherwise fabricate a medical micro pipette tip having an elongated ultra thin distal end portion which accommodates curvilinear displacement while at the same time retaining the structural integrity of the distal pipette wall thereby preventing occlusion of the flow path within the pipette tip.

The present invention has solved this long-standing problem by providing an ultra thin elongated distal end for a medical micro pipette tip wherein a high degree of flexibility is provided for reaching remote and heretofore inaccessible areas, where residual expensive extracts remains and which also has the structural integrity to prevent crimping, buckling, etc. when placed in a radical curvilinear position, wherein the liquid flow path along the hollow interior of the pipette at the distal end portion is not occluded.

Figure 1:
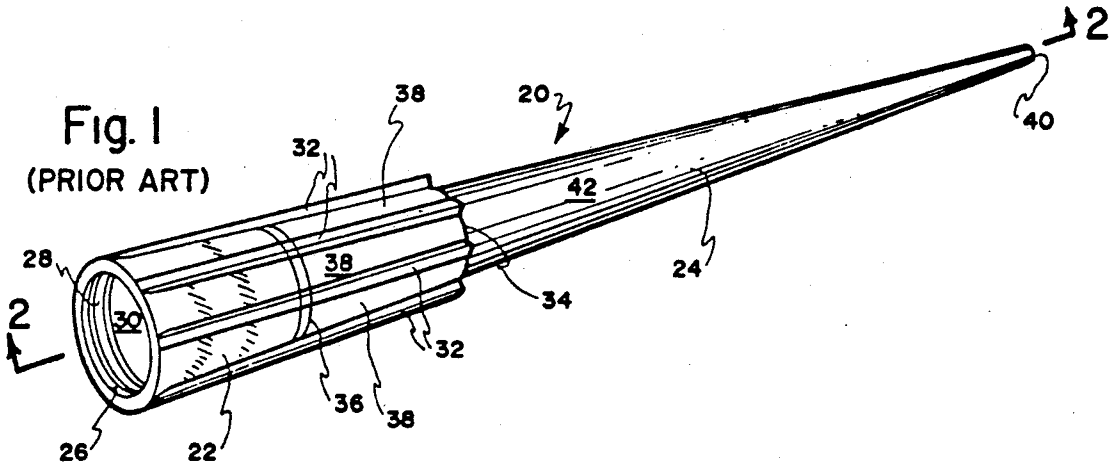
Fig. 1 (PRIOR ART)
FIG. 1 is a perspective representation of a conventional prior art pipette tip used in the medical field.
Figure 2:
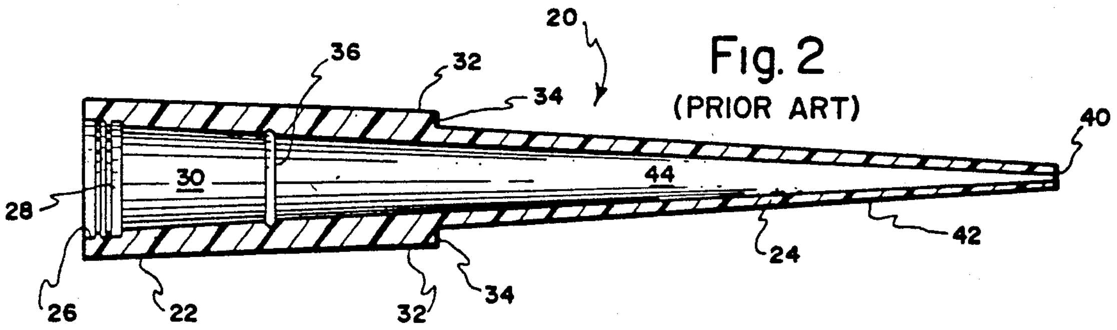
Fig. 2 (PRIOR ART)
FIG. 2 is a cross-section taken along lines 2—2 of FIG. 1.

Specific references is now made to the drawings wherein like numerals are used to designate the like parts throughout. Specifically, FIGS. 1–4 illustrate a conventional prior art pipette tip used to remove medical extract from a storage location to test apparatus. The pipette tip of FIG. 1 is generally designated 20. Pipette tip 20 comprises a proximal end portion 22 and a distal end portion 24. The proximal end portion 22 comprises a proximal port 26 and adjacent sealing rings 28 by which the tip 20 is secured on to any one of several conventional support tools for use.

Typically a plurality of pipette tips 20 are carried in spaced relation by the same support structure and simultaneously inserted respectively into independent containers, such as an array of test tubes, to remove extract. Thereafter the pipette-contained extract is discharged simultaneously from the array of pipette tips into closely spaced independent testing locations, in accordance with current medical testing techniques.

The proximal end portion 22 of the tip 20 comprises a smooth circular interior barrel 30, which tapers essentially uniformly in a converging configuration from back to front (left to right as viewed in FIG. 1). The normal wall thickness of the Proximal end portion 22 is on the order of about 20/1000th of one inch. The proximal end portion 22 comprises several exposed longitudinally directed external ribs 32, which provide strength. The exterior surface of the pipette tip 20 is annularly stepped at shoulder 34.

The smooth tapered interior 30 comprising the flow path within the pipette tip 20 at the proximal end portion 22 is interrupted by an internal annular groove 36 The material from which the pipette tip 20 is fabricated comprises a synthetic resinous material, such as polypropylene, and is transparent or substantially transparent in its preferred form. The groove 36 is, therefore, readily visually perceptible from the exterior of the tip 20 through the wall thereof. In the course of drawing extract into the pipette 20, the operator knows that the desired predetermined quantity of extract has been received within the hollow interior of the pipette tip 20 when the upper level of the extract is visually identified as having reached the groove 36. Note that the exterior surface along the surfaces 38 of the proximal end portion 22 is tapered at essentially the same rate as the interior surface 30.

The pipette tip 20 also comprises a rigid distal end portion 24 extending from the shoulder 34 to the distal edge 40. The distal edge 40 is illustrated as being blunt, i.e. disposed entirely in a plane perpendicular to the axial center line of the tip 20. The distal end portion 24 of the pipette tip 20 is uniformly tapered inside and out at surfaces 42 and 44, respectively. The wall thickness remains constant throughout the length of the distal end portion 24 and is of such a nature that it may not be materially bent, flexed or curvilinearly displaced.

Figure 3:
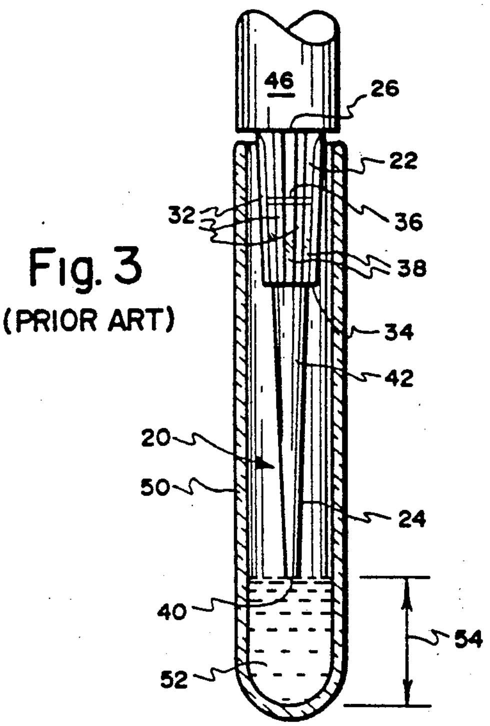
Fig. 3 (PRIOR ART)
FIG. 3 is an elevational view shown partly in cross-section, illustrating the manner in which the prior art conventional pipette of FIG. 1 is used to withdraw extract from a test tube.
Figure 4:
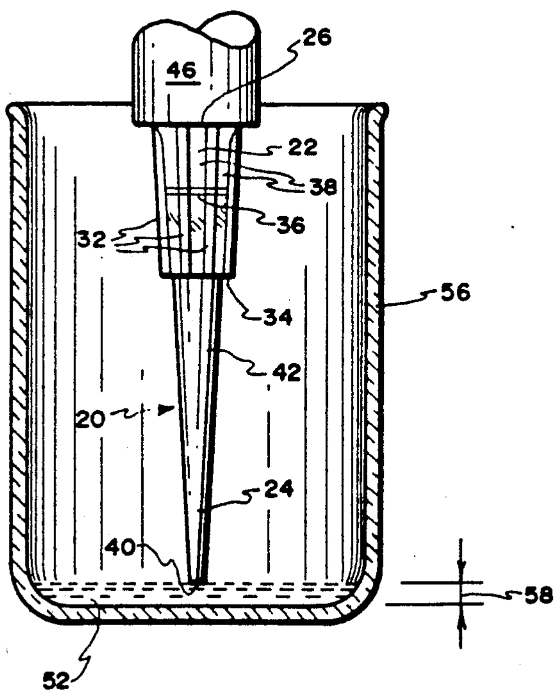
Fig. 4 (PRIOR ART)
FIG. 4 is an elevational view, shown partly in cross-section, illustrating the manner in which the conventional prior art pipette of FIG. 1 is used to withdraw extract from a vial or beaker.

Thus, the pipette tip 20 of FIG. 1 is used to remove extract from test tubes and beakers as illustrated in FIGS. 3 and 4, the pipette tip 20 being mounted to a suitable conventional apparatus 46. The constraints of the removal procedure using the pipette to 20, in relation to a conventional extract test tube 50, are illustrated in FIG. 3, wherein a residual amount of extract 52 in the lower length 54 of the test tube 50 will remain at the end of the withdrawal procedure of extract into the pipette tip 20. Likewise, a residual quantity of extract 52 will remain in the beaker or vial 56 (FIG. 4) to a depth of 58 when the removal process has been completed, using the pipette tip 20. This results in a costly waste of extract and constitutes a long-standing problem in the art, not solved by Proposals of others.

As a result of the problem mentioned immediately above, and the futile efforts of the prior art to successfully address the problem, it has long been thought impossible to provide a low cost, disposable ultra thin elongated medical micro pipette tip capable of being placed in heretofore inaccessible places to remove substantially all contained or confined extract to prevent inefficient waste thereof. The present invention, for the first time, provides a solution to the above-mentioned long-standing problem.

Figures 5, 6, 7, 8:
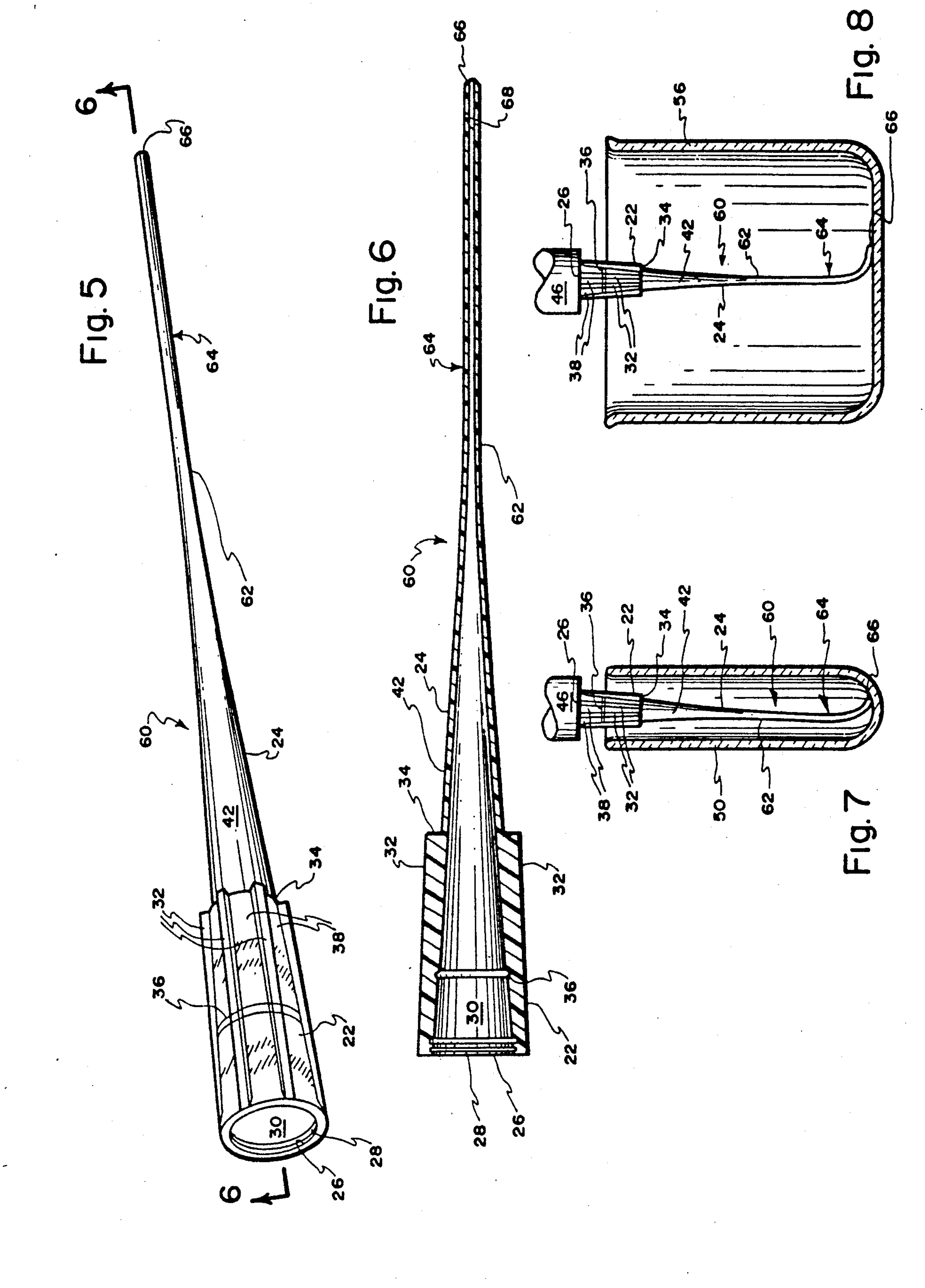
FIG. 5 is a perspective representation of a presently preferred medical micro pipette tip comprising an ultra thin elongated distal end portion, in accordance with the principles of the present invention.
FIG. 6 is a cross-section taken along lines 6—6 of FIG. 5.
FIG. 7 is an elevational view, shown partly in cross-section, of the micro pipette tip of FIG. 5 illustrated as being used to remove substantially all of the extract within a test tube.
FIG. 8 is an elevational view, shown partly in cross-section, of the micro pipette tip of FIG. 5 illustrated as being used to remove substantially all of the extract in a vial or beaker.

One presently preferred pipette to embodiment of the present invention, generally designated 60, is illustrated in FIG. 5. Pipette tip 60, from eft to right up to site or location 62, is identical to the pipette tip 20 illustrated in FIGS. 1–4 and described above, with the exception, that the distal barrel has been substantially lengthened to provide an elongated, ultra thin integral extension 64. Location 62 of tip 60 is the same distance from shoulder 34 as is edge 40 of tip 20. With the exception of extension 64, the pipette to 60 is illustrated as being identical to the pipette tip 20, identical numerals have been provided on FIGS. 5–8 and no further description thereof is believed needed.

The elongated extension 64 is formed as one piece with the remainder of the tip 60 using injection molding techniques. This preferably comprises procedural steps identified in greater detail hereinafter. By way of contrast, the wall thickness of the portion 24 typically is within the range of 15 to 20/1000ths of 1 inch, thereby providing substantial rigidity, whereas the wall thickness of the extension 64, terminating in tapered edge 66 must be within the range of 4 to 10/1000ths of 1 inch, for proper flexibility coupled with sufficient wall integrity to prevent occlusion of the central passage 68. The use of a taper at edge 66 has been found to more readily release extract liquid which otherwise would be retained by surface friction. It has been found that the central passageway 68 should have a diameter within the range of 10 to 20/1000ths of 1 inch, 15/1000ths being presently preferred. It has been found that extension 64 typically should comprise a length on the order of 1-1½ inches, while the length of the remainder of the tip 60 is typically on the order of 2 inches.

In the normal course of events, the injection molding of a pipette tip 60 involves utilization of an elongated core. Conventional core forming techniques normally require grinding of the core to the required diameter It has, however, been found that conventional core forming grinding techniques cannot produce a core having a distal core portion by which a pipette flow path of on the order of 15/1000ths of an inch in diameter can be injection molded. The present pipette tip invention has been accommodated by use of novel core forming technique.

Specific reference is now made to FIG. 15, which illustrates the presently preferred core use in forming medical micro pipette tips 60, the core being generally designated 80. Core 80 comprises a cylindrical base 82, and initial tapered section 84, the presently preferred angle of taper thereof being 2 degrees 08 minutes. An annular projection 86 is integral with the tapered portion 84 and further merges with a tapered section 88, the preferred angle of taper of which is 2 degrees 43 minutes.

Tapered section 88 ends at site 90, which corresponds to site 62 of the pipette tip 60. Site 90 comprises a sanded and polished silver solder site at the end of the heretofore described portion of core 80. Silver solder site 90 merges integrally with and unites to a sewing needle, of conventional stock, 92, the uniform diameter of which is illustrated as being 15/1000ths of one inch. The utilization of the sewing needle 92 as an integral part of the core 80 accommodates, surprisingly, the formation of problem-solving pipette tps, in accordance with the principles of the present invention.

The remainder of the core 80, apart from the needle 92, is preferably formed of stainless steel, capable of resisting corrosion when used within the interior of injection molding apparatus. The flexible nature of the needle 92 does not provide for independent self-centering of the needle portion of the core 80. It has been found necessary to provide a centering abutment 95, having a tapered exposed wall surface 97 converging at a center point, into which the tip 94 of the core 80 is inserted as the core is reciprocated into ts injection molding position, causing the entirety of the core 80 to be axially aligned with precision. Nevertheless, ample room exists through which air is evacuated at abutment 95 from around the core during the injection molding process.

It has been found to be essential that a resin having high melt and easy flow characteristics is essential for the formation of the ultra thin wall of the extension 64. It is also essential that once the injection molded medical micro pipette tip 60 has been formed that the resin forming the same be durable during use. While there are other suitable resins available, it is presently preferred that the tip 60 he formed of polypropylene PD 701 N, available from Himont. Calcium stearate may be used as an additive to the resin to aid in improving the flow characteristics into the mold cavity during the injection molding process.

The pipette tip 60 is constructed to fit a variety of commonly used instruments available in chemical testing laboratories. The mouth of the tip is designed to enable small volume pipetting with good accuracy and to prevent the liquid extract from clinging to the outside of the tip.

In use, as illustrated in FIGS. 7 and 8, the pipette tip 60, attached to an appropriate withdrawal instrument 46, is inserted into a test tube 50 or vial 56 until the flexible extension 64 forcibly engages the bottom of the test tube or vial and is curvilinearly deflected so that the opening at the distal end of passageway 68 is essentially horizontally oriented and can withdraw substantially all of the RNA, DNA or like extract disposed along the bottom of the container.

Thus, the user is able to press the leading end of the pipette tip 60 to a generally horizontal position, through 90; which enables the pipette to draw up substantially all of the extract from the bottom of the container, independent of whether or not the container is a relatively long small diameter test tube, such as test tube 50, or a beaker or a vial, such as container 56.

The zero draft inside diameter of the passageway 68 is helpful in its capillary characteristics, which aid in dispensing ultra micro volumes of the extract samples, as required for laboratory testing. These volumes are typically 0.5 to 50 micro liters.

Figure 9:
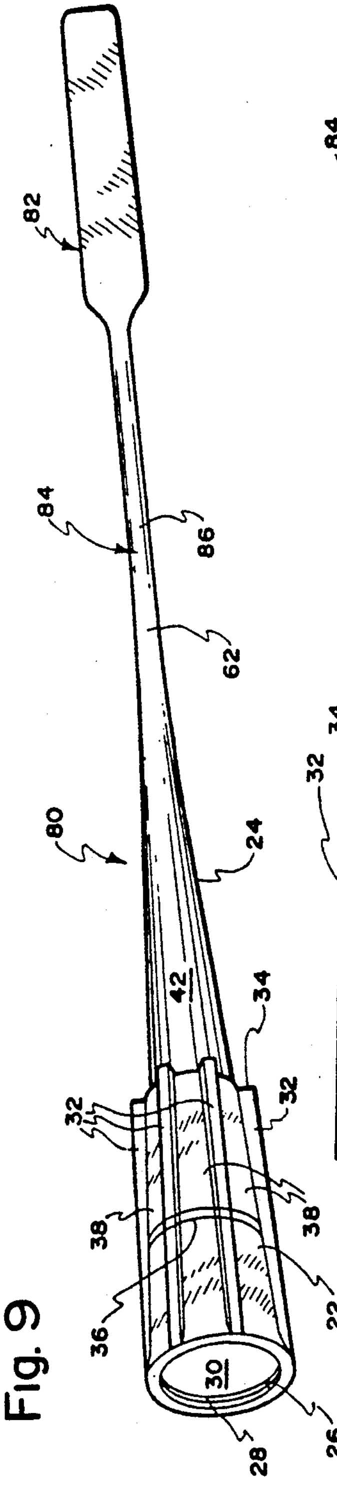
FIG. 9 is a perspective representation of a second presently preferred medical micro pipette tip fabricated in accordance with the principles of the present invention.
Figure 10:
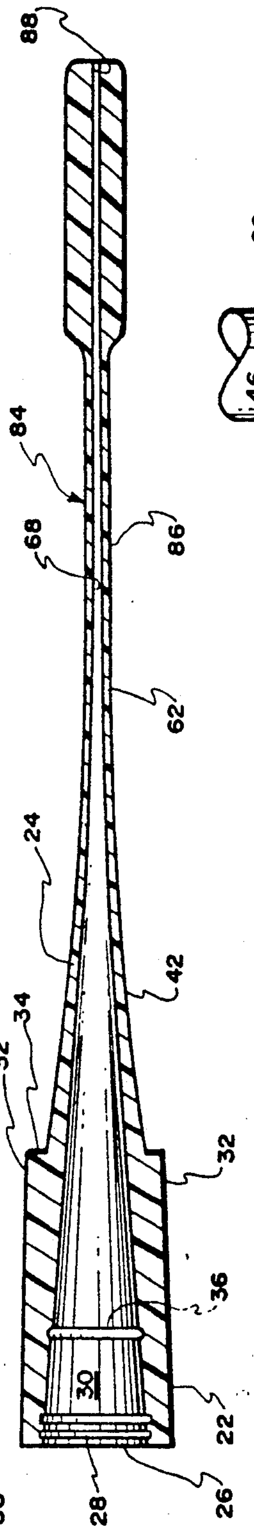
FIG. 10 is a longitudinal cross-section taken along the axially center line of the medical micro pipette tip of FIG. 9.

It is presently preferred that the second preferred medical micro pipette tip of the present invention, generally designated 80 and illustrated in FIG. 9, be formed by further fabrication of the pipette tip 60, heretofore described and illustrated in FIG. 5.

With the exception of the duckbill distal end region 82, the micro pipette tip 80 is illustrated as being the same as the already described micro pipette tip 60 and is so identified by identical numerals in FIGS. 9–12, requiring no further description. However, since the flattened leading portion 82 of the extension 84 is modified in respect to the extension 64 of tip 60, further description in this regard is necessary. Approximately one half of the extension 84 is modified to form the duckbill end 82. Therefore, approximately one half of the extension 84, shown at the left of the duckbill end 82 in FIG. 9 and identified by the numeral 86 is identical to the left one half of the extension 64 (as viewed in FIG. 5) and, therefore, no further description is believed to he needed. The duckbill section 82 comprises a flattened end comprising a passageway 88 which is rectangular in cross-section. Passage 88 is aligned with and extends the passage 68. The rectangular dimensions of passage 88 are preferably on the order of 5/1000ths by 15/1000ths of 1 inch, whereas the passageway 68 is preferably 15/100ths of 1 inch in diameter.

Figure 11:
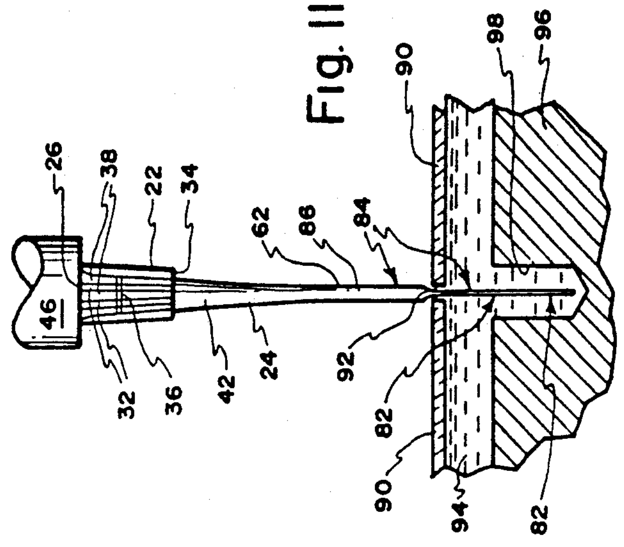
FIG. 11 illustrates in elevation the mannor in which the micro pipette tip of FIG. 9 is used in an electrophoresis process to dispense extract into a cup-shaped recess in a gel layer wherein the micro pipette tip of FIG. 9 is required to enter the electrophoresis environment between the two narrowly spaced plates.
Figure 12:
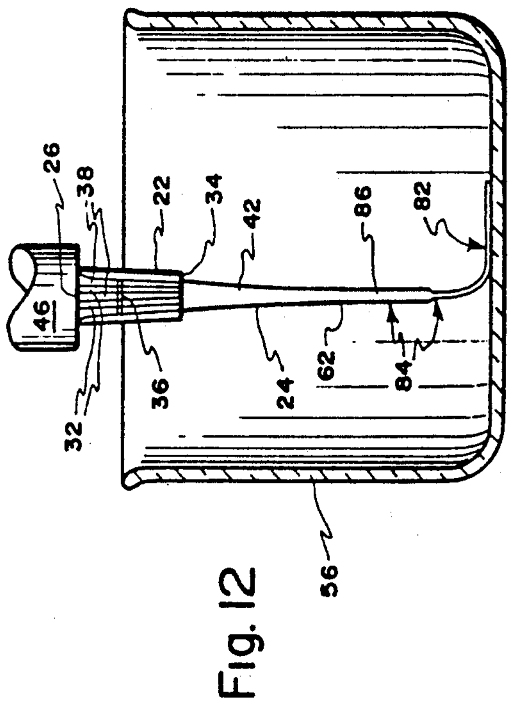
FIG. 12 in an elevational view, shown in cross-section, illustrating the manner in which the pipette tip of FIG. 9 may be used to substantially fully evacuate extract from a vial or beaker.

The flattened end 82, accommodates pickup of extract, to substantially empty containers such as beakers, test tubes and vials (as shown in FIG. 12), so that waste of expensive extract is avoided. At the same time, entry of the flattened portion 82 between electrophorosis glass plates into liquid pockets formed in gel, is accommodated as illustrated in FIG. 11. The glass plates 90, used conventionally in the electrophoresis process are closely spaced along slot 92, the rigid width of which is more than the transverse dimension of the extension 64 of the tip 60 but less than the out-to-out narrow dimension of about 10/1000ths of 1 inch of the flexible duckbill end portion 82.

The plates 90 rust upon a layer of liquid 94, superimposed upon a body of gel 96 into which pockets or gel wells 98 were earlier formed by a spiked tool. The flexible end 82 of the pipette tip 80 is, therefore, desirable in dispensing the extract from pipette tip 80 into well 98 for use in the electrophoresis testing process. Because of the indicated flexibility of the extension 84, including duckbill portion 82, the surface of the associated gel well or pocket 98 is not damaged during the extract injection process, as illustrated in FIG. 11.

Reference is now made to FIGS. 13 and 14 which illustrate the preferred manner, presently contemplated for further fabricating a pipette tip 60 into pipette tip 80. Specifically, a stainless steel mandrel 100, which is rectangular in configuration and has a length slightly in excess of the length of the desired duckbile portion 82 is inserted into the hollow interior passage 68 of a pipette tip 60. The preferred cross-sectional dimensions of the mandrel 100 are 5/1000ths by 15/1000ths of one inch, and the preferred inside diameter of the extension 64 is 15/1000ths. Conventional heat press jaws 102 and 104, diagramtically illustrated in FIG. 13 and 14, are also Provided. The jaws 102 and 104 are closed and a sufficient amount of heat and pressure are used to heat soften and redistribute the synthetic resinous material comprising the distal end of the extension 64 of the tip 60, covering approximately one half the length thereof, as illustrated in FIG. 14. This permanently alters the leading end portion of the extension 64 to form the duckbill section 82 (FIG. 9). Upon opening of the heat pressed jaws 102 and 104 and removal of the pipette tip 80 from the rectangular mandrel 100, the duckbill portion 82 of the tip 80 is allowed to cool, after which it is ready for use upon sterilization as required.

While the foregoing description has been directed to the formation of a single pipette tip 60 or the fabrication of a pipette 80 from a pre-existing tip 60, it is to be appreciated that in the normal course of commercial manufacturing, multiple cavity molds are provided and a series of mandrels 100 used to simultaneously form a plurality of tip 60 and 80, respectively, as described.

The use of a duckbill end such as duckbill end 82 is sometimes desirable for use in conjunction with the conventional tip 20, illustrated in FIG. 1. This duckbill modification of a conventional tip 20 is accomplished as described above and provides a great deal of flexibility at the distal end portion of the pipette tip. This accommodates entry of the distal end of the resulting pipette tip into electrophoresis wells 98 through narrow slot 92 between plates 90.

The invention may be embodied in other specific forms without department from the spirit or essential characteristics thereof. The present embodiment, is, therefore, to be considered in all respects as illustrative and not restrictive, the scope of the invention being indicated by the appended claims rather than by the foregoing description, and all changes which come within the meaning and range of equivalence of the claims are therefore to be embraced therein.

What is claimed and desired to be secured by United States Letters Patent is:

1. A method of forming a synthetic resinous micro pipette tip to create a flat duckbill distal end thereon for access to liquid contained in hard to reach places comprising applying heat and pressure to a substantial length of a rounded exterior of a distal end portion of an existing micro pipette tip while preventing occlusion of an internal passageway in the micro pipette tip to thereby redistribute the synthetic resinous material at said distal end portion to create a flat duckbill section of substantial length having a bore, a minor transverse dimension substantially less than an initial transverse size of the distal end portion and a major transverse dimension substantially more than the initial transverse size of the distal end portion.

* * * * *